United States Patent …

(12) United States Patent
Shanmugam et al.

(10) Patent No.: US 10,579,277 B1
(45) Date of Patent: Mar. 3, 2020

(54) NON-DISRUPTIVE INSERTION OF VIRTUALIZED STORAGE APPLIANCE

(71) Applicant: EMC IP Holding Company LLC, Hopkinton, MA (US)

(72) Inventors: Sadasivam Shanmugam, Hosur (IN); Srikanth Venkataraman, Ka (IN); Rajkumar Manicka, Ka (IN); Steven Richard Bromling, Edmonton (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/795,424

(22) Filed: Oct. 27, 2017

(51) Int. Cl.
*G06F 9/455* (2018.01)
*G06F 3/06* (2006.01)

(52) U.S. Cl.
CPC .......... *G06F 3/0613* (2013.01); *G06F 3/0665* (2013.01); *G06F 3/0689* (2013.01); *G06F 9/45558* (2013.01); *G06F 2009/4557* (2013.01)

(58) Field of Classification Search
CPC ..................................................... G06F 3/0613
USPC ............................................. 718/1, 100–105
See application file for complete search history.

(56) References Cited

U.S. PATENT DOCUMENTS

| | | | | |
|---|---|---|---|---|
| 6,356,863 B1* | 3/2002 | Sayle | ..................... | G06F 16/192 703/27 |
| 7,685,129 B1* | 3/2010 | LeCrone | ............... | G06F 3/0617 707/999.01 |
| 7,711,908 B2* | 5/2010 | Satoyama | ............. | G06F 3/0614 711/154 |
| 7,783,788 B1* | 8/2010 | Quinn | .................... | G06F 9/5077 710/10 |
| 7,979,701 B1* | 7/2011 | Gandhasri | ............. | G06F 21/602 713/165 |

(Continued)

OTHER PUBLICATIONS

Noorshams et al, "A Generic Approach for Architecture-Level Performance Modeling and Prediction of Virtualized Storage Systems", ACM, pp. 339-442, 2013 (Year: 2013).*

(Continued)

*Primary Examiner* — Anil Khatri
(74) *Attorney, Agent, or Firm* — Muirhead and Saturnelli, LLC

(57) ABSTRACT

Non-disruptive insertion of a storage appliance provides virtualized storage. A first logical device of a data storage system is exposed to a first host and a second host. A data store of the first logical device is uniquely identified using a signature. After inserting the storage appliance between the first host and the data storage system, the first logical device is presented, through the storage appliance, to the first host as a second logical device. After inserting the storage appliance between the second host and the data storage system, the first logical device is presented, through the storage appliance, to the second host as the second logical device. The first and second hosts identify the second logical device and the first logical device as the same logical device using the signature. The data store may be a virtual machine file system data store used by virtual machines on the hosts.

19 Claims, 10 Drawing Sheets

(56) References Cited

U.S. PATENT DOCUMENTS

| | | | | |
|---|---|---|---|---|
| 8,271,979 | B2* | 9/2012 | Sugimoto | G06F 3/061 718/100 |
| 8,458,695 | B2* | 6/2013 | Fitzgerald | G06F 9/455 713/164 |
| 8,819,383 | B1* | 8/2014 | Jobanputra | G06F 3/0613 711/154 |
| 8,832,686 | B2* | 9/2014 | Smith | G06F 9/445 718/1 |
| 8,924,964 | B2* | 12/2014 | Kodi | G06F 9/45558 718/1 |
| 8,937,965 | B2* | 1/2015 | Shimozono | H04L 49/253 370/419 |
| 8,949,826 | B2* | 2/2015 | Fitzgerald | G06F 9/45537 718/1 |
| 9,009,437 | B1* | 4/2015 | Bjornsson | G06F 3/0665 370/389 |
| 9,038,062 | B2* | 5/2015 | Fitzgerald | G06F 9/45533 718/1 |
| 9,710,465 | B2* | 7/2017 | Dornemann | G06F 16/2308 |
| 9,984,245 | B2* | 5/2018 | Schmitt | G06F 21/53 |
| 10,387,073 | B2* | 8/2019 | Bhagi | G06F 11/1464 |
| 10,459,664 | B1* | 10/2019 | Dreier | G06F 3/0667 |

OTHER PUBLICATIONS

Huang et al, "Joint Management of Performance-predictable Virtualized Storage Devices with Hard Disk and Flash Memory", ACM, pp. 461-466, 2013 (Year: 2013).*

Savoldi et al, "Logical and Physical Data Collection of Windows CE Based Portable Devices", ACM, pp. 1448-1449 (Year: 2008).*

Da Silva et al, "Ecient System Exploration and Synthesis of Applications with Dynamic Data Storage and Intensive Data Transfer", ACM, pp. 76-81 (Year: 1998).*

Zhou et al, "Optimizing Virtual Machine Live Storage Migration in Heterogeneous Storage Environment", ACM, pp. 73-84 (Year: 2013).*

Hu et al, "A Quantitative Study of Virtual Machine Live Migration", ACM, pp. 1-10 (Year: 2013).*

Jo et al, "Efficient Live Migration of Virtual Machines Using Shared Storage", ACM, pp. 1-10 (Year: 2013).*

Nathan et al, "Resource Availability Based Performance Benchmarking of Virtual Machine Migrations", ACM, pp. 387-398 (Year: 2013).*

Khanna et al, "Application Performance Management in Virtualized Server Environments", IEEE, pp. 373-381 (Year: 2006).*

* cited by examiner

NON-DISRUPTIVE INSERTION OF VIRTUALIZED STORAGE APPLIANCE

BACKGROUND

Technical Field

This application generally relates to data storage and more particularly to techniques used in connection with non-disruptive insertion of an appliance providing virtualized storage.

Description of Related Art

Computer systems may include different resources used by one or more host processors. Resources and host processors in a computer system may be interconnected by one or more communication connections. These resources may include, for example, data storage devices such as those included in the data storage systems manufactured by Dell Inc. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage system containing a plurality of host interface units, disk drives (or more generally data storage devices or physical storage devices), and disk or storage device interface units. The host systems access the storage device through a plurality of channels provided therewith. Host systems provide data and access control information through the channels to the storage device and the storage device provides data to the host systems also through the channels. The host systems do not address the physical storage devices directly, but rather, access what appears to the host systems as a plurality of logical disk units. The logical units may or may not correspond to the actual physical devices or drives.

SUMMARY OF THE INVENTION

Various embodiments of the techniques herein include a method, computer readable medium, and system for non-disruptive insertion of a storage appliance providing virtualized storage. A first logical device of a data storage system is exposed to a first host and a second host. First processing is performed that inserts the storage appliance providing virtualized storage between the first host and the data storage system. After the first processing, the first logical device is presented, through the storage appliance, to the first host as a second logical device. A data store is provisioned from physical storage of the first logical device and the data store is uniquely identified by a signature stored on the first logical device. Second processing is performed that inserts the storage appliance providing virtualized storage between the second host and the data storage system. After the second processing, the first logical device is presented, through the storage appliance, to the second host as the second logical device.

In at least one embodiment, the first logical device and the second logical device may be configured to each have a different logical device identifier. The first logical device and the second logical device may be configured to have the signature as a same signature identifying the data store as a same data store on both the first logical device and the second logical device. The data store may be a virtual machine file system data store.

Prior to the first processing, the first host may include a first virtual machine and the second host may include a second virtual machine. The first logical device and the second logical device may be identified by the first host and the second host as a same logical device configured with the virtual machine file system data store. Prior to the first processing, the first virtual machine and the first host may access the data store through the first logical device and not the second logical device. The first virtual machine may be migrated from the first host to the second host while any application executing in a context of the first virtual machine continues execution during the migration of the first virtual machine from the first host to the second host. After the first processing and prior to the second processing, the first virtual machine and the second virtual machine may be migrated from the second host to the first host while any applications executing in a context of the first virtual machine continue execution during the migration of the first virtual machine from the second host to the first host, and any applications executing in a context of the second virtual machine continue execution during the migration of the second virtual machine from the second host to the first host.

After the first processing and after migrating the first virtual machine from the second host to the first host, the first virtual machine and the first host may access the data store through the second logical device presented by the storage appliance, and the first virtual machine and the first host may not access the data store through the first logical device presented by the data storage system. Prior to the second processing and prior to migrating the second virtual machine from the second host to the first host, the second virtual machine and the second host may access the data store through the first logical device and not the second logical device.

Additional processing may be performed subsequent to the second processing, and the additional processing may include migrating the second virtual machine from the first host to the second host while any applications executing in a context of the second virtual machine continue execution during the migration of the second virtual machine from the first host to the second host. After the additional processing, the second virtual machine and second host may access the data store through the second logical device presented by the storage appliance, and the second virtual machine and second host may not access the data store through the first logical device presented by the data storage system.

The first logical device may have its storage provisioned from first physical non-volatile storage of the data storage system. The data store may have its data stored on the first physical non-volatile storage provisioned for the first logical device. The second logical device presented by the storage appliance may be mapped to the first logical device, and the second logical device may have its storage provisioned from the first physical non-volatile storage provisioned for the first logical device. The first processing may include the first host mounting the second logical device having the data store identified using the signature. The second processing may include the second host mounting the second logical device having the data store identified using the signature. The first logical device and the second logical device may be viewed by the first host, after the first processing, and may be viewed by the second host, after the second processing, as including the same data store on both the first logical device and the second logical device.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
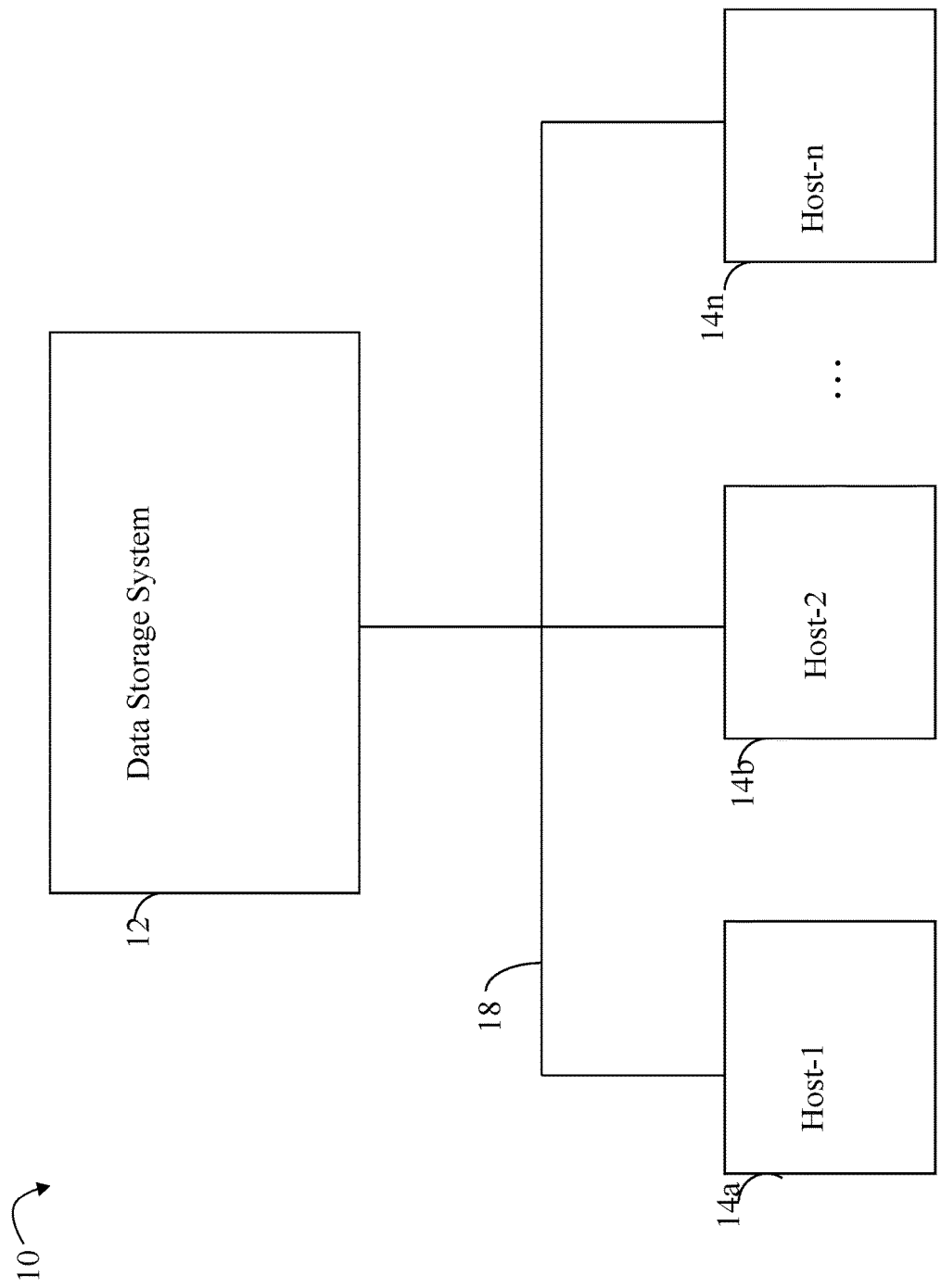
FIG. 1 is an example of components in an embodiment in accordance with techniques herein.

Referring now to FIG. 1, shown is an example of an embodiment of a system that may be used in performing the techniques described herein. The system 10 includes a data storage system 12 connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, ESCON, Fibre Channel, iSCSI, or GIGE (Gigabit Ethernet), and the like. Some or all of the connections by which the hosts and data storage system 12 may be connected to the communication medium 18 may pass through other communication devices, such as switching equipment, a phone line, a repeater, a multiplexer or even a satellite.

Each of the host computer systems may perform different types of data operations in accordance with different tasks and applications executing on the hosts. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

Figure 2A:
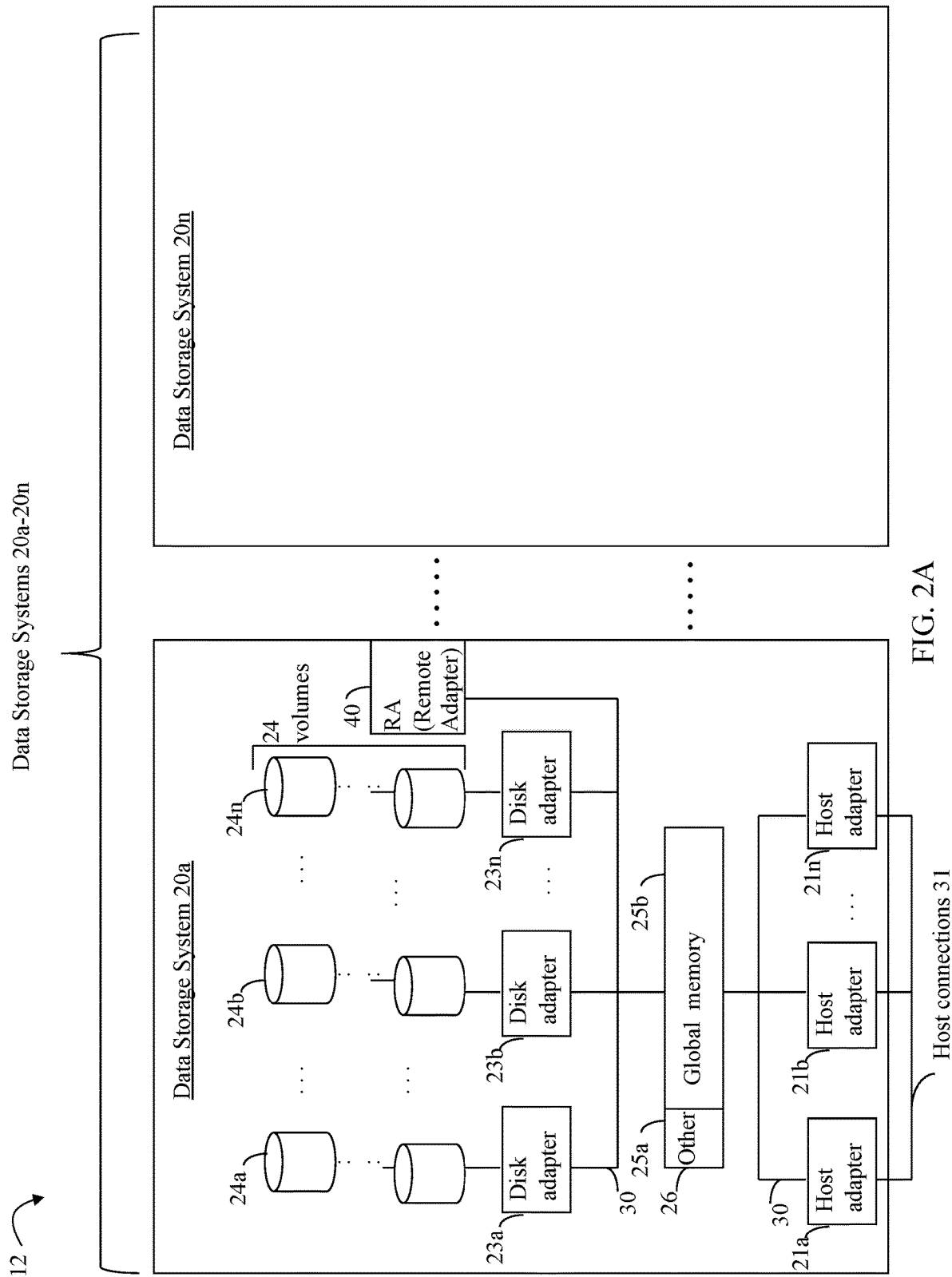
FIG. 2A is an example of an embodiment of a data storage system.

Referring now to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems.

Each of the data storage systems, such as 20a, may include a plurality of data storage devices (e.g., physical non-volatile storage devices), such as disk devices or volumes, in an exemplary arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a. The system 20a may also include one or more host adapters ("HAs") or directors 21a-21n. Each of these HAs may be used to manage communications and data operations between one or more host systems and the global memory. In an embodiment, the HA may be a Fibre Channel Adapter or other adapter which facilitates host communication.

Also shown in the storage system 20a is an RA or remote adapter 40. The RA may be hardware including a processor used to facilitate communication between data storage systems, such as between two of the same or different types of data storage systems.

One or more internal logical communication paths may exist between the DA's, the RA's, the HA's, and the memory 26. An embodiment, for example, may use one or more internal busses and/or communication modules. For example, the global memory portion 25b may be used to facilitate data transfers and other communications between the DA's, HA's and RA's in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

It should be generally noted that the elements 24a-24n denoting data storage devices may be any suitable storage device such as a rotating disk drive, flash-based storage, and the like. The particular data storage system as described in this embodiment, or a particular device thereof, such as a rotating disk or solid state storage device (e.g., a flash-based storage device), should not be construed as a limitation. Other types of commercially available data storage systems, as well as processors and hardware controlling access to these particular devices, may also be included in an embodiment.

In at least one embodiment, write data received at the data storage system from a host or other client may be initially written to cache memory (e.g., such as may be included in the component designated as 25b) and marked as write pending. Once written to cache, the host may be notified that the write operation has completed. At a later point time, the write data may be destaged from cache to the physical storage device, such as the non-volatile physical storage device accessed by a DA. In connection with reads, processing may include first looking to see if the requested read data is in cache whereby a read hit occurs. For a read hit, the read is serviced using the cached copy of the requested read data by returned the cached read data to the requester. Thus, with a read hit, there is no need to access the physical (back end) non-volatile storage by the DA to obtain the requested read data thereby resulting in a faster read I/O response time. If the requested read data is not in cache, the requested read data is obtained from the physical (back end) non-volatile storage by the DA where the read data is then stored in the cache, and returned to the requester. The cached copy of the read data may then be available to further service any other subsequent reads. As known in the art, any suitable cache management techniques may be used to maintain the cache, for example, such as is determining how long data remains in cache, whether to prefetch data, selecting data stored in the cache for eviction, and the like.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices, logical volumes or logical units (LUNs). The LUNs may or may not correspond to the actual disk drives. For example, one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LUN(s) residing thereon.

Figure 2B:
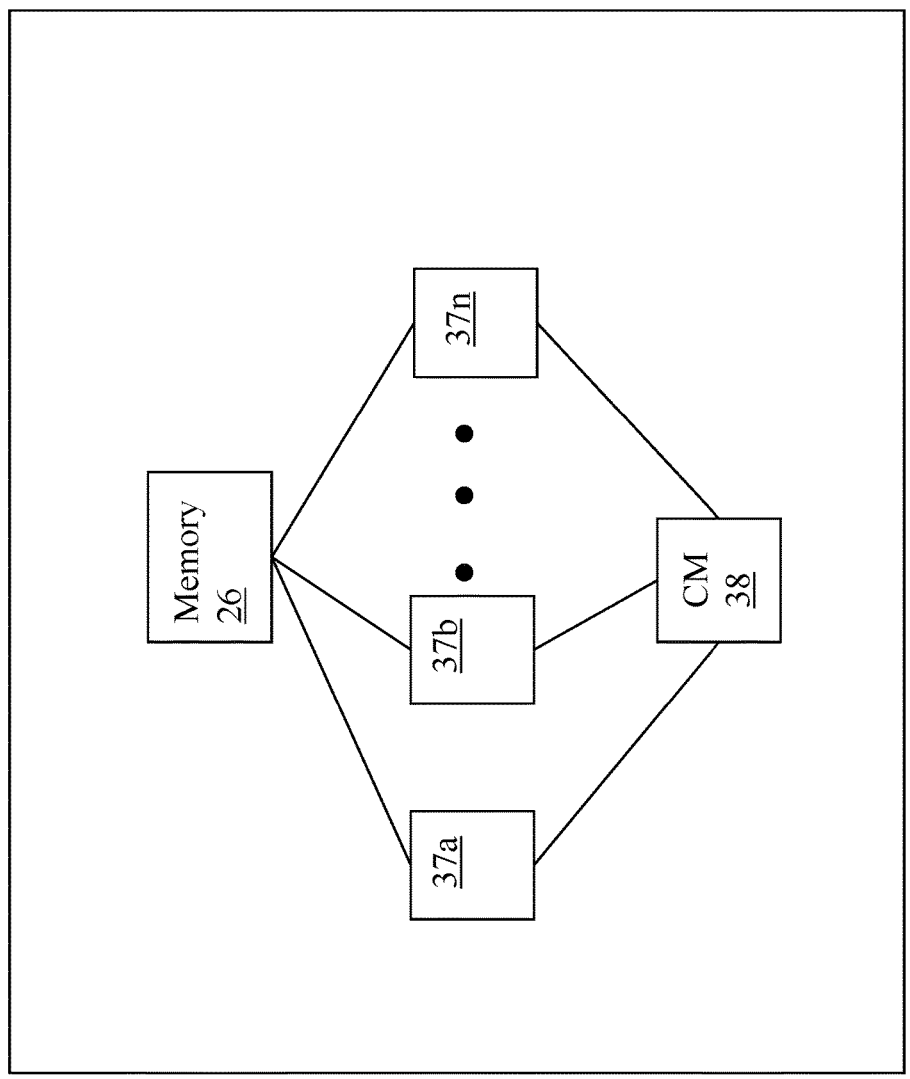
FIG. 2B is a representation of the logical internal communications between the directors and memory included in one embodiment of the data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HA's, RA's, or DA's that may be included in a data storage system. In an embodiment disclosed herein, there may be up to sixteen directors coupled to the memory 26.

Other embodiments may use a higher or lower maximum number of directors that may vary. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

In an embodiment of a data storage system in accordance with techniques herein, components such as HAs, DAs, and the like may be implemented using one or more "cores" or processors each having their own memory used for communication between the different front end and back end components rather than utilize a global memory accessible to all storage processors.

It should be noted that although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

Figure 3:
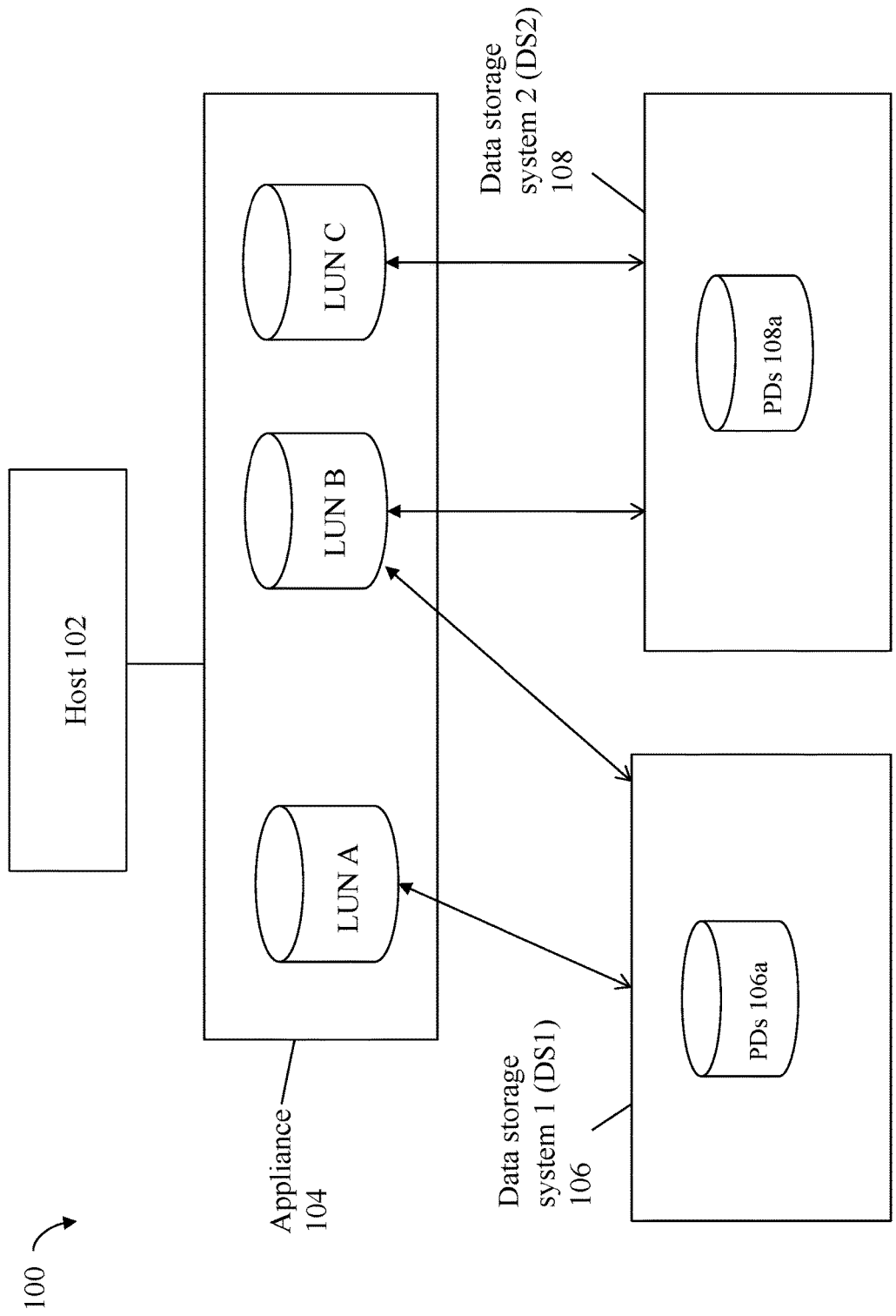
FIG. 3 is an example of a data storage system using an appliance in an embodiment in accordance with techniques herein.

Referring to FIG. 3, shown is another example of another embodiment that may utilize the techniques herein. The example 100 includes a host 102, appliance 104, DS1 (data storage system 1) 106 and DS2 (data storage system 2) 108. The appliance 104 may be a data storage virtualization appliance such as an VPLEX™ storage appliance by Dell Inc. which accesses and aggregates storage from multiple data storage systems DS1 and DS2 whereby each such data storage system may be of the same or different types (e.g., same or different manufacturers as well as different array types that may be from a same manufacturer). In this manner, the appliance 104 may present storage of DS1 and DS2 in an aggregated virtualized environment to the host 102 and other clients. The host 102 communicates with the appliance 104 to access data on any one of the virtualized storage devices LUNs A-C exposed to the client, such as host 102, and each such virtualized storage device of the appliance may have its underlying physical storage provisioned from one or more physical storage devices (PDs) of one or both of the storage systems 106, 108. LUNs A, B and C may be virtualized logical devices or volumes presented by the appliance 104 as logical devices to the host 102 where LUN A may have underlying storage provisioned on PDs 106a of DS1 106, LUN B may have underlying storage provisioned from PDs of both data storage systems 106 and 108 (e.g., provisioned from PDs 106a and also PDs 108a), and LUN C may have underlying storage provisioned on PDs 108a of DS2 108.

In the example 100, the systems 106, 108 may both be data storage systems including other components as described above in connection with FIGS. 1, 2A and 2B. The host 102 may be, for example, a physical server, a virtual machine (VM) or even a cluster of multiple physical server computer systems or VMs.

Generally, migration of customer data from one data storage system to another may pose challenges depending on the customer configuration. A host may be connected to a first data storage system, such as illustrated in FIG. 1, without an intervening virtualized appliance. At a later point in time, a new data storage system may be purchased, for example, such as a replacement for the existing first data storage system whereby the host's data as stored on the first data storage system must be migrated to the new data storage system for use by the host. Existing data migration techniques may be disruptive with respect to applications on the host accessing the data. It may be desirable to perform such migration in a non-disruptive manner with respect to the host application's ability to access its data as stored on the data storage system.

A storage appliance, such as appliance 104, may be used in an existing configuration to non-disruptively perform data migration between data storage systems. For example, with reference to FIG. 3, a third data storage system DS3 (not illustrated) may be a new data storage system that will replace existing data storage system DS1 106. In this example, LUN A will be reconfigured to have its physical storage provisioned from the system DS3. Since LUN A is presented as a virtualized logical device using the appliance 104, the appliance can handle reconfiguring LUN A to have its storage provisioned from DS3 rather than DS1 in a manner that is transparent to the host. Additionally, data of LUN A may be migrated from DS 1 106a to the new data storage system DS3 in a manner that is transparent to the host 102. Although use of the storage virtualization appliance 104 may facilitate data migration between data storage systems DS1 and DS3, initially introducing or inserting the appliance 104 that provides the virtualized presentation of the multiple data storage systems (e.g., DS1, DS2 in the aggregate) into a customer storage environment for use by the host 102 may be initially disruptive. For example, at a first point in time, the host 102 may initially access its storage on a LUN of a data storage system, such as illustrated in FIG. 1, without an intervening virtualized appliance. Subsequently, the customer environment may be reconfigured to insert the appliance between the host and the data storage system in a manner similar to that as illustrated in FIG. 3. In connection with this initial insertion of the appliance, the necessary reconfiguration of the LUNs, which will now be provisioned and presented by the newly inserted storage appliance to the host, may be disruptive from the perspective of the applications on the host (e.g., applications on the host are not able to continuously and non-disruptively issue I/Os to the LUNs storing application data).

Described in following paragraphs are techniques that may be used to non-disruptively insert an appliance providing such virtualized storage, such as in the form of LUNs, to a host whereby the host's access to its data stored on such LUNs using virtualized storage is not disrupted. The host may have applications executing thereon which execute in the context of virtual machines (VMs). In at least one embodiment in accordance with techniques herein, VMs may execute in a virtualized environment where the VMs may access and use data stored on logical device or LUNs. For example, an embodiment may have one or more VMs executing on a single physical machine in a virtualized server environment using virtualization software, such as from VMware, Inc. In the context of each VM, one or more applications may be executed, where the applications may include any one or more of, for example, an email server application such as Microsoft Exchange Server (MES), a web server, or a database server application. The VMs may execute, for example, on one or more physical hosts each being a different physical computer system or server. Each VM may access and use data stored on one or more LUNs having physical storage provisioned on a data storage system at a first point in time without use of a virtualized storage appliance. As described in more detail below, techniques herein may provide for non-disruptive insertion of the appliance intervening between the host and one or more data storage systems, whereby the appliance may present the LUNs as logical devices using virtualized storage provisioned transparently provisioned from one or more data storage systems.

It should be noted that although embodiments described herein may refer to VMWare and its virtualization environment, more generally, techniques herein may be extended for use with other virtualized server environments of any suitable vendor.

Figure 4:
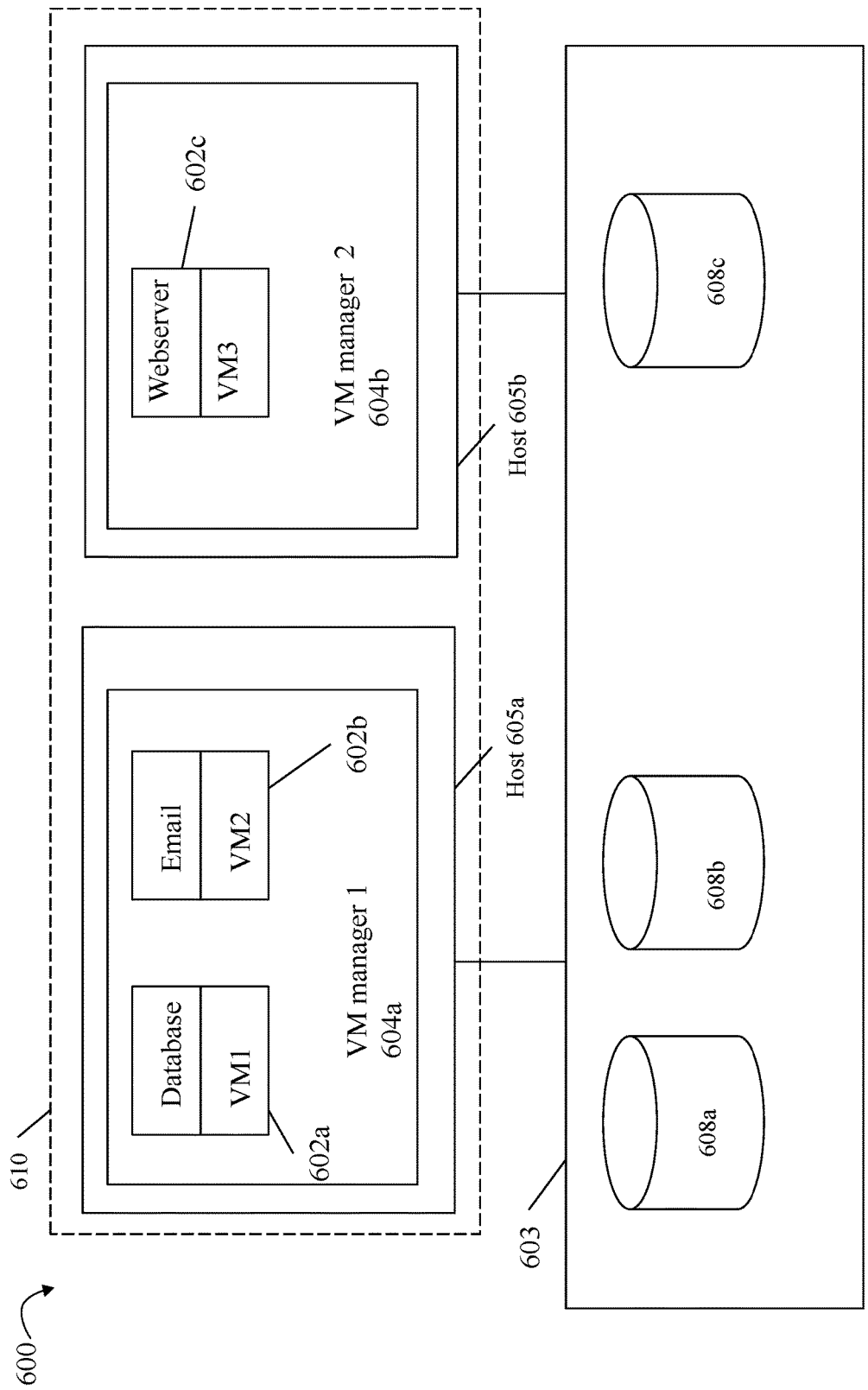
FIGS. 4 and 5 are examples of a first initial configuration of a components that may be used in an embodiment in accordance with techniques herein.

Referring to FIG. 4, shown is an example 600 that includes VM 1 602a and VM2 602b managed by VM manager 1 604a, and VM3 602c managed by VM manager 2 604b. Each of 604a, 604b may be a hypervisor that performs VM management in connection with multiple VMs such as VMware ESXi Server. Such a hypervisor may be installed and run directly on server hardware without requiring an underlying operating system. Each of the VM managers 604a, 604b may perform management of the underlying server's physical resources for use among the multiple VMs that can run simultaneously. In this example, a database application is executed by VM1 602a, an email application is executed by VM2 602b and a webserver is executed by VM3 602c. VM manager 1 604a may execute on a first host 605a and VM manager 2 604b may execute on a second host 605b. Data storage system 603 may include physical storage provisioned for use with LUNs 608a, 608b, 608c. VMs 602a-c may access and use data stored on LUNs 608a-c having their storage provisioned from PDs of the data storage system 603. The hosts 605a-b may be two physical server computer systems. In at least one embodiment, the hosts 605a-b may be configured as a cluster 610, such as a VMware ESX cluster, where such physical machines provide resources for the hosts 605a-b that are assigned to that cluster.

FIG. 4 illustrates an example of an existing arrangement and configuration of a systems and associated network as in a customer's environment at a first point in time without use of a storage appliance providing virtualized storage, such as without use of an appliance 104 as in FIG. 3. In the example embodiment of FIG. 4, the applications 602a-c on the hosts 605a-b forming the cluster 610 access the LUNs 608a-c through connections and communications to the data storage system 603 without use of an intervening storage appliance. It should be noted that generally, the LUNs 608a-c may be stored on multiple data storage systems rather than a single data storage system 603 as illustrated for simplicity in the example of FIG. 4.

Described in following paragraphs are techniques that may be used in connection with subsequently inserting a storage appliance providing virtualized storage (as described in connection with FIG. 3) intervening between the hosts of the cluster 610 and the data storage system 603 whereby the LUNs 608a-c are then presented as virtualized storage LUNs or volumes exposed directly to the cluster 610 through the appliance rather than through the data storage system 603 that provides the underlying provisioned physical storage for the LUNs. As used herein, insertion may be characterized as the process of moving or migrating an application to use virtualized storage such as LUNs presented through the appliance. As discussed herein the appliance presents LUN as virtualized LUNs having physical storage provisioned from one or more data storage systems. In connection with discussion herein, a LUN, logical device or volume as presented through the appliance, such as discussed in connection with FIG. 3, may also be referred to herein as a virtual LUN, virtualized LUN, or LUN presented through the appliance where the LUN has virtualized storage provided by one or more underlying data storage systems connected to the appliance. Such virtual LUNs may be distinguished from non-virtualized or non-virtual LUNs presented directly to clients from the underlying data storage system (where physical storage is provisioned for the non-virtualized LUN).

In following paragraphs, an embodiment may use any suitable APIs (application programming interfaces), utilities, and other software and hardware that may be applicable for use in performing techniques herein. For example, in at least one embodiment using VMs in a VMWare environment, an API may be used in connection with issuing commands. In at least one embodiment in accordance with techniques herein using VMs as provided by VMWare, vStorage APIs for Array Integration (VAAI) may be used. VAAI may be characterized as a collection of set of APIs used to issue control path commands for data storage management and configuration (e.g., create or provision storage for a LUN, file system, and the like), as well as for issuing I/O commands over the data path (e.g., read and write commands to read data from, and write data to, a LUN). Such an API may be used in connection with one or more supported protocols, such as the SCSI protocol. Additionally, various provided software products may be used in performing processing as described in following paragraphs in accordance with techniques herein. For example, in connection with migrating VMs in a VMWare environment, an embodiment may use VMware® VMotion™ for VM migration such as between hosts. As known in the art, VMware® VMotion™ enables the live migration of running VMs from one physical server or host to another with zero downtime, continuous service availability, and complete transaction integrity.

In such an embodiment, VMware VMFS (Virtual Machine File System) may be characterized as a cluster file system that facilitates storage virtualization for multiple hypervisors, such as multiple installations of VMware ESX Server, as illustrated in connection with the cluster configuration in FIG. 4. Generally, each VMFS instance is a shared data store or data container provisioned from a LUN (e.g., block-based storage device). Each VMFS data store created in a LUN has a unique signature or UUID (universal or globally unique identifier) that is stored in the file system superblock. In at least one embodiment, the UUID used as the VMFS data store signature may be created using multiple attributes or characteristics uniquely identifying the VMFS data store. For example, an embodiment may generate the VMFS UUID or signature using the system time and CPU timestamp of VMFS creation, a random number and a MAC address such as associated with a port of the host used to create the VMFS data store. When the LUN having such a VMFS data store configured thereon, is replicated or when a snapshot of the LUN is made, the resulting LUN copy is identical, byte-for-byte, to the original LUN. As a result, if the original LUN contains a VMFS data store with UUID X, the LUN physical copy includes an identical VMFS data store, with the same UUID X. Similarly, the snapshot of the LUN appears to contain a VMFS data store copy with the same UUID X. In an embodiment as described herein, ESXi hosts can determine whether a LUN contains the VMFS data store copy, and either mount the data store copy on the LUN with its original UUID or change the UUID to resignature the data store. When a LUN contains a VMFS data store copy, the data store may be mounted with the existing signature or assign a new signature. A VMFS data store copy can be mounted without changing its signature if the original is not mounted (e.g., cannot have two VMFS data stores with the same signature or UUID). In at least one embodiment in accordance with techniques herein, a single dedicated LUN may be used to configure and create each VMFS data store.

As described in more detail in following paragraphs in an embodiment using an ESX cluster environment, the LUNs are consumed as data stores using VMFS. As noted above, each VMFS data store writes its signature (UUID) onto the LUN. The cluster (e.g., hosts, applications, VMs, etc. in the cluster) identifies a VMFS data store based on this signature or UUID. In accordance with techniques herein, the same VMFS signature will be associated with the original LUN and its VMFS data as presented directly by the data storage system to the host and cluster, and also as presented to the host and cluster through the appliance. Techniques herein utilize the VMFS signature or UUID of the original LUN and VMFS data store to retain the identity of the LUN before, during and after the cut-over using the appliance whereby, after cutover, the LUN is presented by the appliance as a virtualized storage volume or logical device (e.g., virtualized LUN) having the same UUID as the original LUN and VMFS data store. In other words, techniques herein leverage the VMFS signature mechanism to mount a virtualized LUN and its VMFS data store presented by the appliance having the same UUID as the original VMFS data store on the original LUN. In an embodiment using an ESX cluster, this may be accomplished by inserting the virtual LUN on one or more selected hosts in the cluster at a time, whereby overall insertion may be done in a staged manner. During the insertion, on a selected set of one or more source hosts of the cluster, the applications and guest VMs running and using the VMFS data store (and underlying LUN from which the VMFS data store is provisioned) may be moved to the remaining set of target hosts. Additionally, a virtual LUN is made available for remount, through the virtualizing appliance, where the virtual LUN is provisioned for the VMFS data store using the same VMFS signature as prior to the insertion. Once the virtual LUN is remounted for use by the one or more source hosts of the selected set, the application and VMs (currently on the target hosts and that originated from the source hosts) are migrated back to the source hosts (which now access the VMFS data store through the presented virtual LUN). The foregoing may be repeated until all hosts are presented with the virtual LUN through the appliance. The foregoing and other aspects of techniques herein are described in more detail in following paragraphs whereby applications executing in the context of VMs of the cluster continue to run without any I/O failures.

Figure 5:
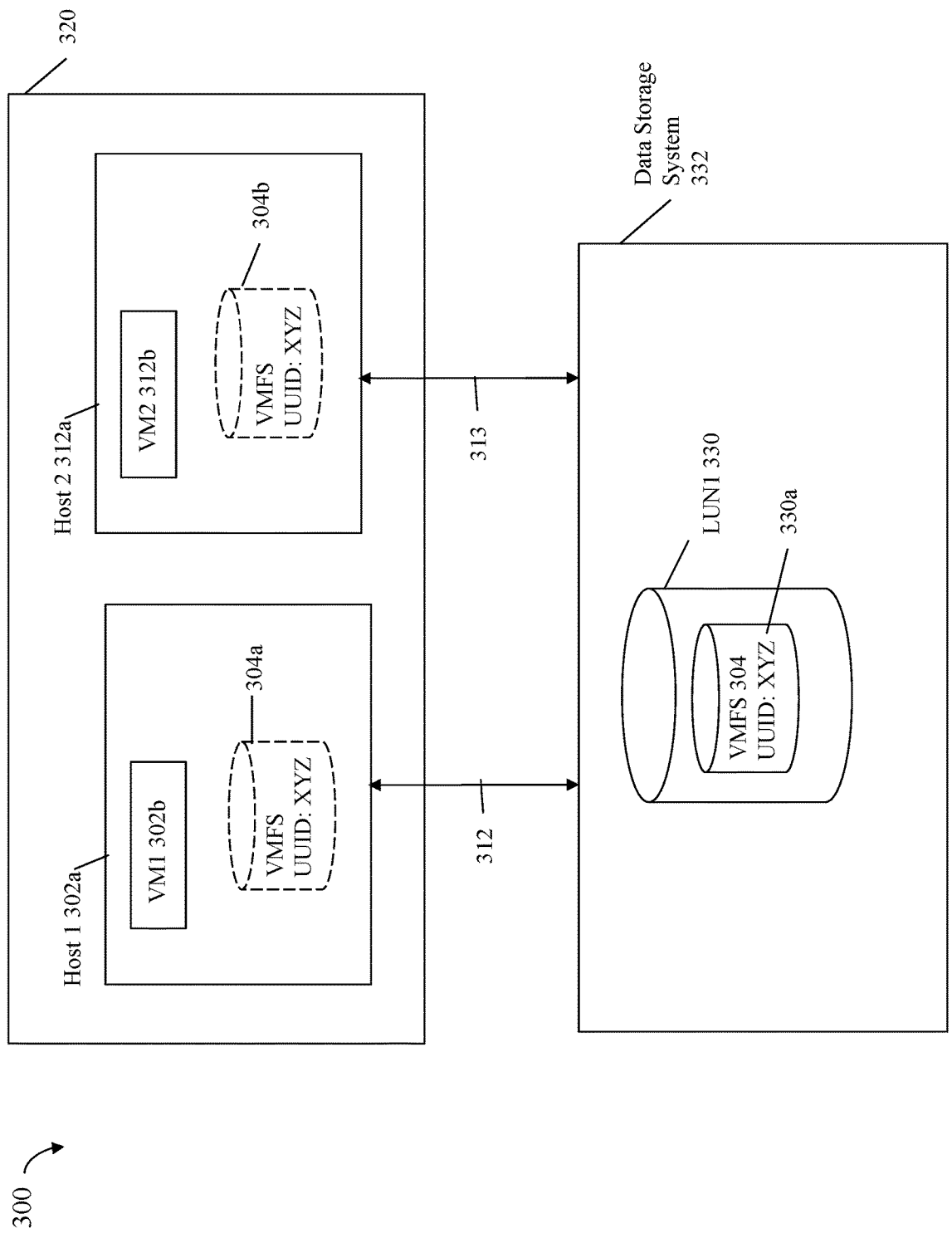

Referring to FIG. 5, shown is an example illustrating an existing configuration at a first point in time in an embodiment in accordance with techniques herein. The example 300 includes cluster 320, hosts 302a and 312a, VMs 302b and 312b, and VMFS data store 304 provisioned from LUN 1 330. The VMFS data store 304 has an associated UUID or signature of XYZ. The VMFS data store 304 is a shared data store (e.g., shared between hosts 302a, 312a and VMs 302b, 312b executing thereon) having its storage provisioned from LUN 1 330. The dashed outlined element 304a indicates that the VMFS data store 304 (e.g., stored on LUN 1 330 of the data storage system 332) is accessible and exposed to the host 302a and its VM 302b. The dashed outlined element 304b indicates that the VMFS data store 304 (e.g., stored on LUN 1 330 of the data storage system 332) is accessible and exposed to the host 312a and its VM 312b. Thus, the example 300 includes components similar to those as described in connection with other figures in discussion above with additional elements or components omitted for simplicity of illustration.

In the example 300, LUN 1 330 denotes a non-virtualized LUN as discussed herein that is presented or exposed directly to the hosts 302a, 312a by the data storage system 332 without an intervening virtualizing storage appliance such as 104 of FIG. 3. As discussed herein, each of the hosts 302a, 312a identify each VMFS data store using its associated UUID, such as UUID of XYZ in this example. Additionally, in accordance with techniques herein, each LUN exposed or presented to the hosts 302a, 312a in the virtualized environment may be identified using the UUID of the VMFS data store having its storage provisioned on the LUN. Thus, in FIG. 5, the hosts 302a, 312a identify LUN 1 330 exposed through the data storage system 332 using the VMFS signature or UUID of XYZ (330a). Element 312 may denote the connection over which the LUN 1 330 is exposed by the system 332 to the host 1 302a whereby the host 1 302a may mount the LUN 1 330 and its associated VMFS data store 304. Element 313 may denote the connection over which the LUN 1 330 is exposed by the system 332 to the host 2 312a whereby the host 2 312a may mount the LUN 1 330 and its associated VMFS data store 304.

Figure 6:
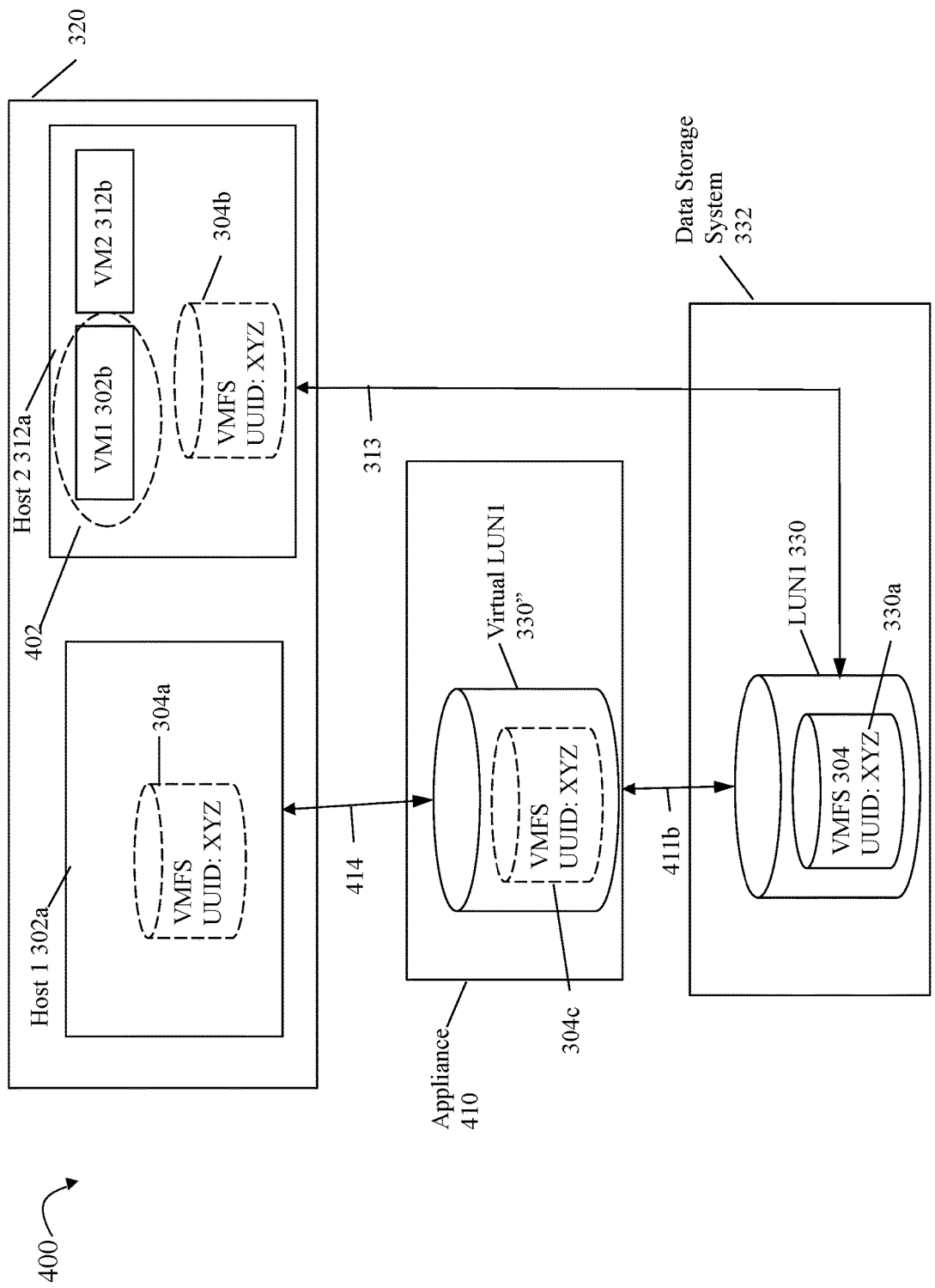
FIGS. 6, 8 and 9 are examples illustrating subsequent steps that may be performed in an embodiment in accordance with techniques herein.

With reference to FIG. 6, shown is an example 400 illustrating the first stage performed in an embodiment in accordance with techniques herein. In the example 400, the appliance 410 providing virtualized storage is inserted between host 1 302a and the data storage system 332. This first stage may include performing the following steps:

1) Migrate Guest VM1 302b from host 1 302a to host 2 312a while the application continues executing within the context of the VM1 302b (e.g., such migration may be performed using VMotion by VMWare).

2) Zone the LUN 1 non-virtual volume 330 such that it is not viewed or exposed to host 1 302a (e.g., may include rezoning or modifying network fabric information such as used in switches and the like).

3) Modify information on the data storage system 332 to remove or disallow access by Host1 302a to LUN 1 330.

4) Export the virtual LUN 1 330" to host 1 302a (e.g., such as using commands issued from the appliance 410).

5) Mount the virtual LUN 1 330" exported by the appliance 410 in host 1 302a (e.g., such as using the mount command of the ESX CLI (command line interface)).

Element 402 denotes the migration or movement of VM1 302b from host 1 302a to host 2 312a (as in step 1 above).

In connection with step 4), the LUN 1 330 and its VMFS data store 304 having the UUID or VMFS signature 330a is presented through the appliance 410 as virtual LUN 1 330" with the same UUID or VMFS signature 330a. In this manner, both LUNs 330 and 330" may be mapped to, and have storage provisioned from, the same physical storage on data storage system 332 (e.g., effectively virtual LUN1 330" is configured to have storage provisioned from the same physical storage as LUN 1 330 of the data storage system 332). However, both virtual LUN1 330" and LUN 1 330 may each have their own unique LUN or device identifiers (IDs) as described below in more detail. Virtual LUN 1 330" and non-virtual LUN 1 330 may both be provisioned from the same physical storage and have the same physical copy or instance of the VMFS data store 304. Element 304c denotes the instance of the VMFS data store 304 (having physical storage provisioned on data storage system 332) presented or made available (414) through the virtual LUN 1 330" (as presented or exposed by the appliance 410) whereby the host 1 302a may mount (in step 5) the virtual LUN 1 330" and its associated VMFS data store 304. Additionally, and consistent with discussion and illustration in FIG. 5, the same instance of the VMFS data store 304 (having physical storage provisioned on data storage system 332) is also presented or made available (313) through the LUN 1 330 (as presented or exposed by the data storage system 332), whereby the host 2 312a may maintain its mounting of the LUN 1 330 and its associated VMFS data store 304.

In at least one embodiment as described herein, mounting a VMFS data store copy may be possible only if it does not collide with the original VMFS data store that has the same UUID. Thus, to mount the copy in such an embodiment as in connection with step 4 above, the original VMFS data store (as mounted through 312 as in FIG. 5) has to be offline. In connection with step 4) above, the virtual LUN1 330" exported by the appliance 401 may be mounted on host 1 302a persistently so that the UUID or signature for a detected VMFS data store remains the same even if the associated device identifier (device ID) or LUN identifier (LUN ID) for the VMFS data store is modified. Thus, the mount command of step 4) above may be performed successfully even though the host 1 302a had previously mounted the VMFS data store 304 with the same UUID but different LUN ID (e.g., as in connection with FIG. 5).

The LUN ID or device id is one of many ways in which a LUN may be identified. In this embodiment, the LUN or device ID may denote the device ID as used in the SCSI standard to uniquely identify the exposed LUN to all hosts. As such, the LUN or device ID associated with LUN 1 330 is different than the LUN or device ID associated with virtual LUN 1 330" even though both such LUNs 330 and 330" may have the same associated UUID or VMFS signature (e.g., signature of "XYZ" in this example). In connection with techniques herein, multiple different LUNs 330 and 330" exposed to the hosts of the virtual cluster and both LUNs 330, 330" may be presented with the same VMFS signature. LUN 1 330 may be presented directly from the data storage system 332 with the VMFS signature. The virtual LUN 1 330" may be the original LUN 1 330 presented as a virtual LUN by the virtual storage appliance 410.

Figure 7:
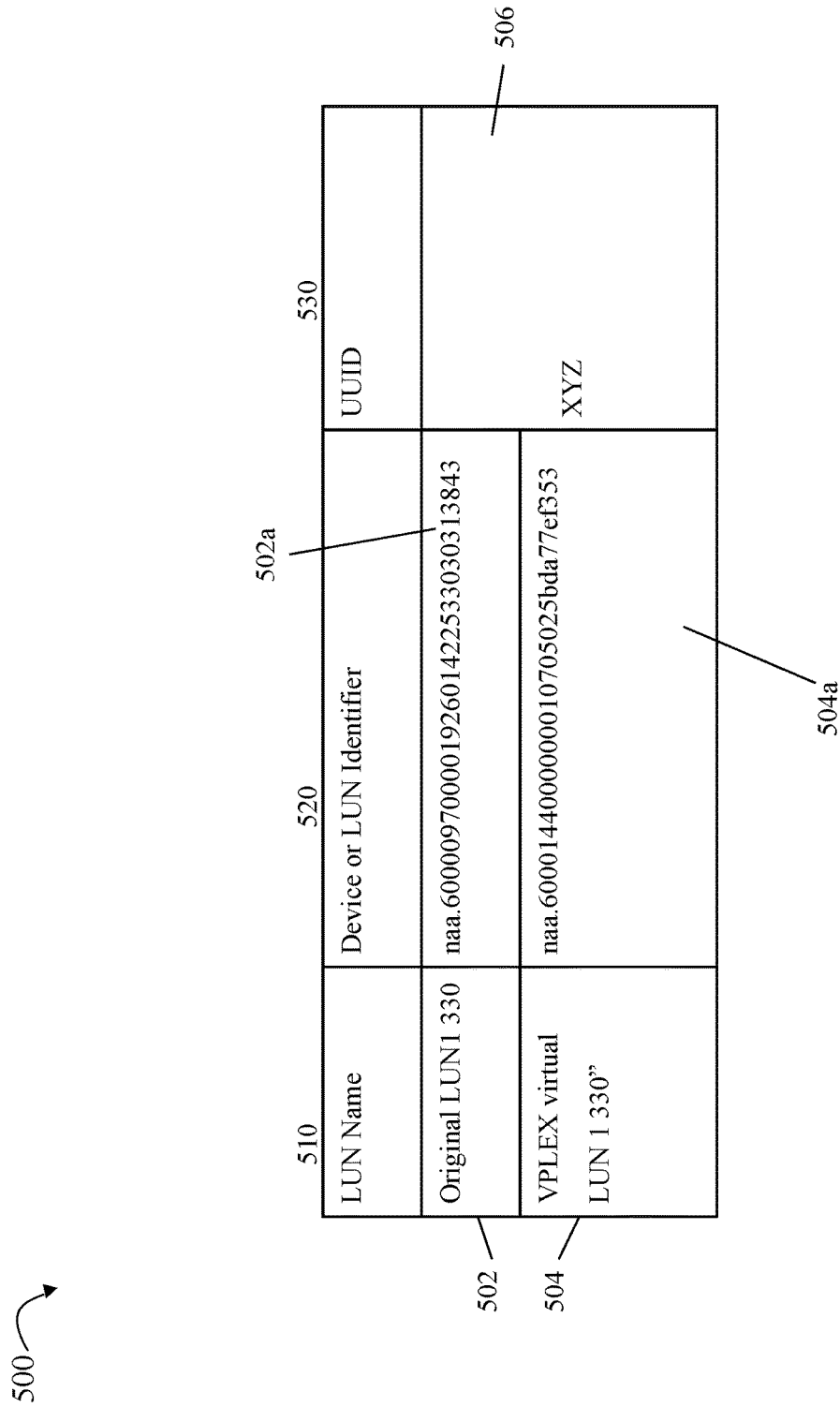
FIG. 7 is an example of information that may be associated with LUNs used in an embodiment in accordance with techniques herein.

To further illustrate, consider the table of information as in the example 500 of FIG. 7 in connection with the embodiment and components of FIG. 6. The table 500 includes the following columns: LUN name 510, device or LUN ID 520, and UUID 530. Row 502 denotes information associated with the original non-virtual LUN 1 330 as presented to the hosts directly by the data storage system 332. Row 504 denotes information associated with the virtual LUN 1 330" as presented to the hosts by the appliance 410. Element 502a indicates the original LUN 1 330 has a first LUN or device ID that is different than a second LUN or device ID 504a of the virtual LUN 1 330". However, element 506 indicates that both the LUNs 330 and 330" have the same UUID used to uniquely distinguish and identify the different VMFS data stores. Element 506 may denote the UUID of the VMFS data store 304. It should be noted that the UUID of XYZ is a simplified example of a UUID that, more typically, includes many more alphanumeric characters in order to provide the desired level of uniqueness. For example, "5821e080-d6851194-217d-001d09f1bfbf" is a more typical example of a complex UUID or VMFS data store that may be used in an embodiment in accordance with techniques herein.

In this manner, the same VMFS data store may be persisted (persistently mounted) across different LUNs (e.g., 330, 330") that may be mounted at different points in time. In such a system using VMs, the UUID or VMFS signature may be effectively used to uniquely identify and distinguish among different LUNs providing storage to the hosts and VMs independent of the LUN or device IDs of such different LUNs. Thus, two exposed LUNs (e.g., 330, 330") having the same VMFS signature or UUID (e.g., 330a) may be considered by the VMs and hosts of the cluster 320 in a virtualized environment as effectively the same LUN or volume with the same VMFS data store. In a system not using VMs, the LUNs exposed through the appliance 410 and data storage system 332 may use the LUN or device ID in column 520 rather than the UUID of the VMFS data store to identify unique data storage volumes or logical devices.

Figure 8:
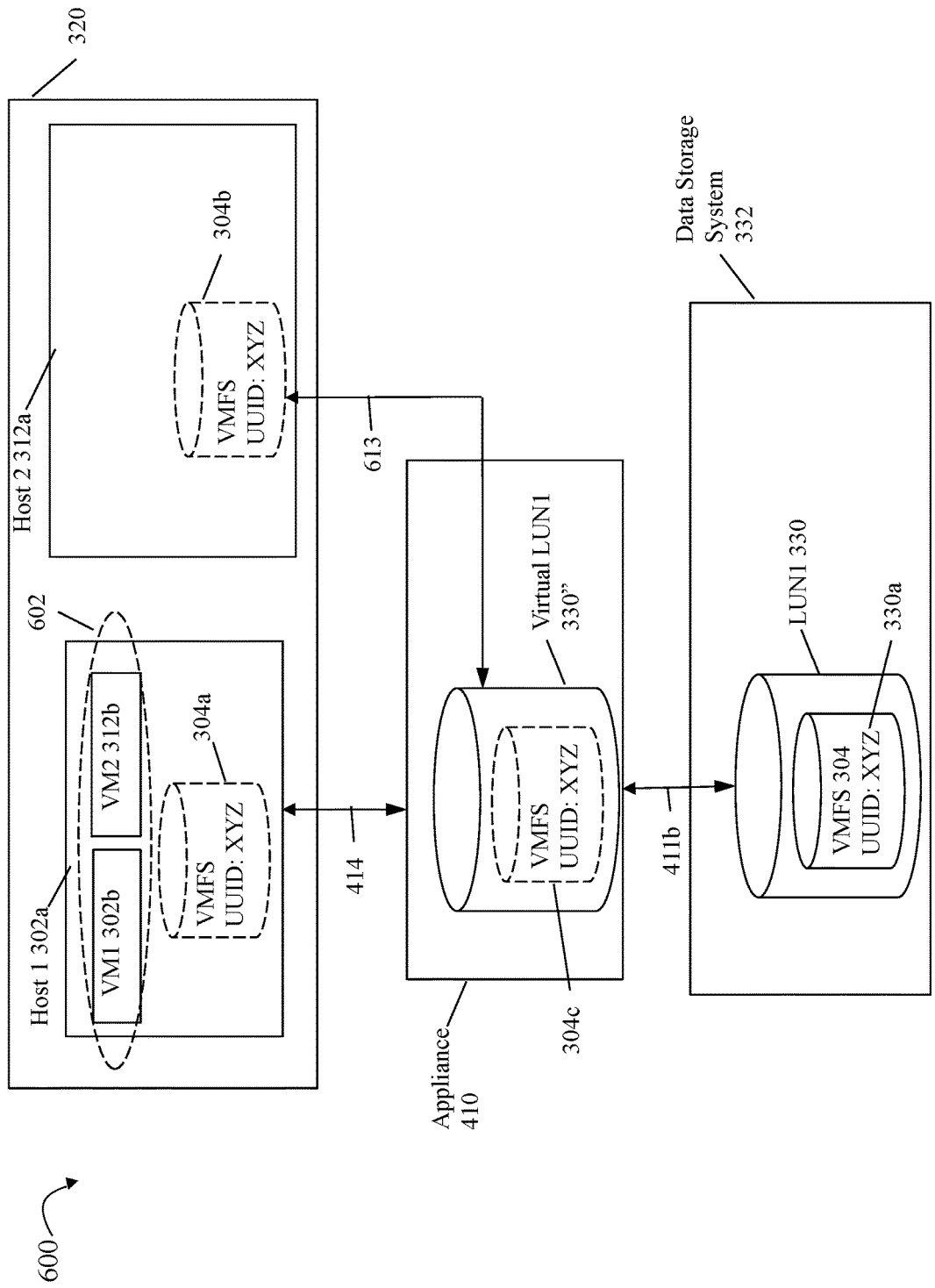

Continuing with processing of techniques herein with reference now to FIG. 8, a second stage of steps may be performed to insert the appliance between the host 2 312a and the data storage system 332. The second stage performs configuration changes with respect to host 2 312a subsequent to processing as described and illustrated in connection with FIG. 6 and may include:

6) Migrate both VM1 302b and VM2 312b from host 2 312a to host 1 302a with the applications executing. (This step 6 is similar to step 1 above with the difference that both VMs are migrated from host 2 312a to host 1 302a)

7) Zone non-virtualized LUN 1 330 (as presented by the data storage system 332) such that it cannot be seen by host 2 312a. (This step 7 is similar to step 2 above with the difference that it is performed with respect to host 2 312a rather than host 1 302a).

8) Remove host 2 312a access to LUN 1 330 presented by the data storage system 332. (This step is similar to step 3 above with the difference that it is performed with respect to host 2 312a rather than host 1 302a).

9). Export the virtual LUN 1 330" to ESX Host 2 312a. (This step 9 is similar to step 4 above with the difference that the LUN 330" is exposed or exported to host 2 312a rather than host 1 302a).

10). Mount the virtual LUN 1 330" exported by the appliance 410 using the ESX CLI of ESX Host-2. (This step 10 is similar to step 5 above with the difference that the LUN 330" is mounted for use by VMs on host 2 312a rather than host 1 302a).

In the example 600, similarly numbered components are as in FIG. 6. Additionally, element 602 in the example 600 illustrates the migration step 6 of the VMS from host 2 312a to host 1 302a. In FIG. 8, the connection 313 of FIG. 6 has been removed and FIG. 8 alternatively includes element 613 denoting the connection over which the virtual LUN 1 330" is exposed to the host 2 312a whereby the host 2 312a may mount (in step 10) the virtual LUN 1 330" and its associated VMFS data store 304c (e.g., which maps to the same underlying physical storage of the data store 304 on data storage system 332). Additionally, and consistent with discussion and illustration in FIG. 6 in connection with element 414, the host 2 312a may maintain its mounting of the virtual LUN 1 330" as presented by appliance 410.

Figure 9:
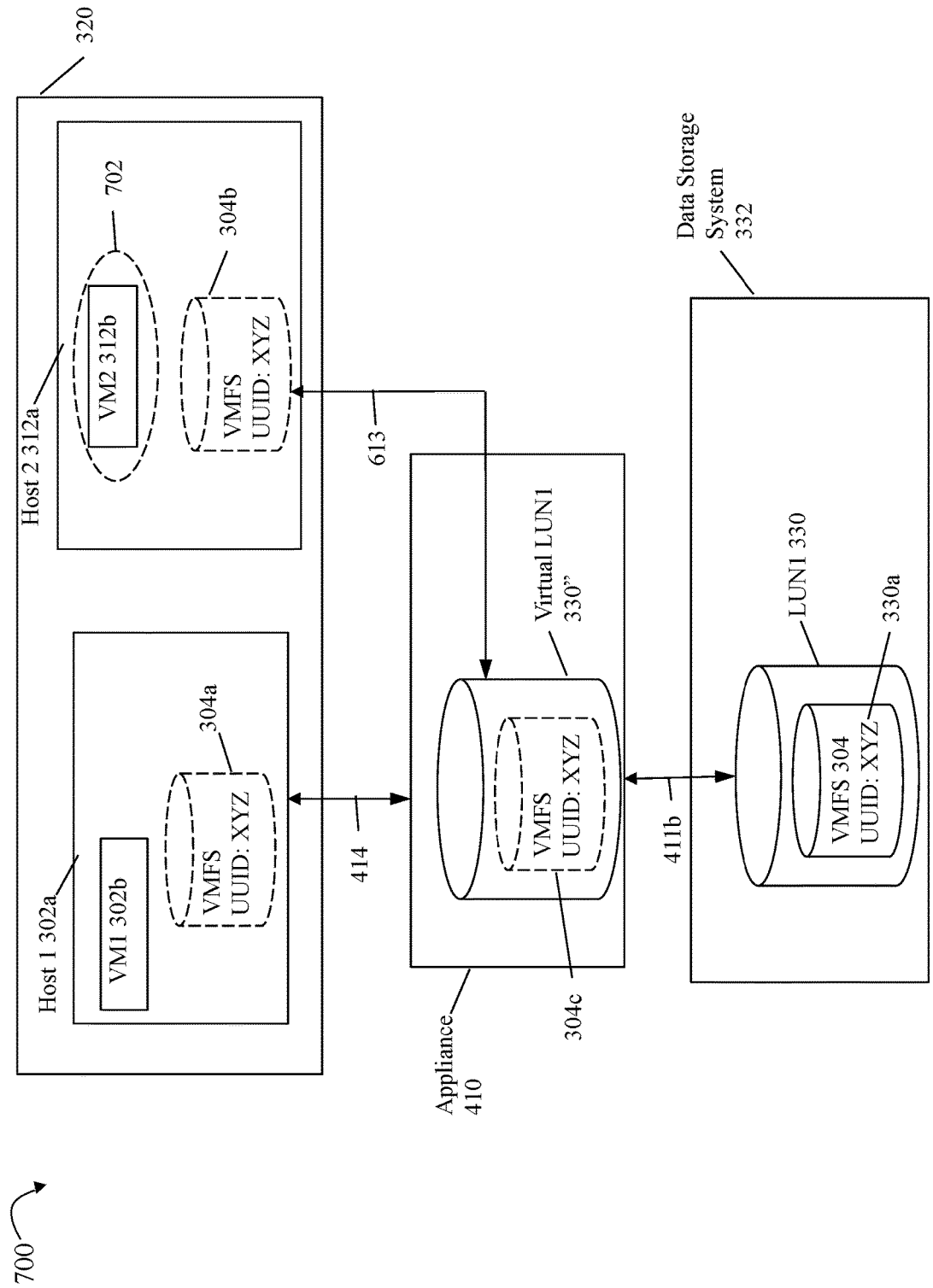

Continuing with processing of techniques herein with reference now to FIG. 9, a third stage of steps may be performed. The third stage of the non-disruptive insertion of the appliance 410 may be performed subsequent to processing as described and illustrated in connection with FIG. 8 and may include the following steps:

11) Migrate VM2 312b from host 1 302a to host 2 312a.

Step 11 is similar to migration performed in step 6 with the difference that VM2 312b is migrated back to its original host 2 312a (as represented by 702). With the completion of step 11, the hosts are returned to their original configuration. Further, the systems and components in FIG. 9 denote the original configuration with the difference that the appliance 410 is now inserted and whereby the hosts view and access the virtual LUN 1 330" as presented through the appliance rather than the LUN 1 330 directly through the data storage system 332.

In some embodiments in accordance with techniques herein, the appliance 410 may have its own appliance-local cache in addition to caching that may be performed on the data storage system 332. With caching enabled on the appliance 410, the appliance may service I/Os directed to a LUN using its cached data in a manner similar to that as a data storage system uses its cache. For example, for a read I/O directed to one of the virtualized LUNs presented by the appliance 410 to the hosts, the appliance 410 may look to see whether its cache includes the requested read data rather than further issue the read request to the data storage system 332 for the read data. In at least one embodiment in accordance with techniques herein, the appliance 410 may operate in a cacheless mode in connection I/O directed to virtual LUN 1 330" though still taking advantage of caching in the data storage system, if available, in order to avoid any issues in connection with stale cache data and cache coherency that may otherwise occur (with respect to caches of the appliance 410 and data storage system 332). As an alternative, if caching is enabled on the appliance for the virtual LUN 1 330", an embodiment may use any other suitable technique to ensure cache coherency with respect to caches of the appliance 410 and data storage system 332 to avoid any potential data corruption.

In at least one embodiment as described herein, each LUN used to provision storage for a VMFS data store has metadata that may be accessed and modified. As such, an embodiment may use any suitable technique to ensure proper synchronization and access to the shared metadata. For example, an embodiment may protect and synchronize access to the metadata available for shared access among multiple hosts and the appliance 410 using locks. A request to lock, such as for exclusive write access, particular portions of the metadata (as stored on physical storage of 332 for the LUN 1 330 and also virtual LUN 1 330") can be originate from the host and may be directed to appliance (if the host is accessing virtual LUN 1 330") or directly to the data storage system (if the host is accessing LUN 1 330). In such an embodiment, the locks and associated state are shared among the data storage system 332 and the appliance 410 so that the appliance 410 and data storage system 332 are both aware of any/all lock requests and associated state in connection with LUNs 330 and 330". In one such embodiment, hosts 302*a*, 302*b* may issue lock requests to either the appliance 401 or data storage system 332 and the appliance 410 may operate in a pass-through mode (where such requests may be passed through to the system 332 for handling) so that the underlying data storage system can implement the locking atomically across requests coming through the appliance 410 and requests on data paths directly connected to the data storage system 332.

Although examples are described herein using only 2 hosts and only one VM per host, more generally, such techniques may be readily applied for use in connection with any suitable number of hosts (e.g., more than 2) and any suitable number of VMs executing on each host (e.g., more than 1 VM per host) as may be supported for in an embodiment in accordance with techniques herein.

An embodiment may implement the techniques herein using code executed by a processor. For example, an embodiment may implement the techniques herein using code which is executed by one or more processors of the data storage system, or more generally any other system. As will be appreciated by those skilled in the art, the code may be stored on the data storage system on a computer-readable medium having any one of a variety of different forms including volatile and nonvolatile, removable and non-removable media implemented in any method or technology for storage of information such as computer readable instructions, data structures, program modules or other data. Computer-readable media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of non-disruptive insertion of a storage appliance providing virtualized storage comprising:

exposing a first logical device of a data storage system to a first host and a second host, wherein a data store is provisioned from physical storage of the first logical device and the data store is uniquely identified by a signature stored on the first logical device, wherein the first host and the second host each identify the first logical device using the signature uniquely identifying the data store;

performing first processing that inserts the storage appliance providing virtualized storage between the first host and the data storage system, wherein after said first processing, the first logical device is presented, through the storage appliance, to the first host as a second logical device, wherein the first host identifies the second logical device and the first logical device as a same logical device using the signature uniquely identifying the data store, wherein the first logical device is provisioned from first physical non-volatile storage of the data storage system, wherein the data store has its data stored on the first physical non-volatile storage provisioned for the first logical device, wherein the second logical device presented by the storage appliance is mapped to the first logical device, and the second logical device is provisioned from the first physical non-volatile storage provisioned for the first logical device; and performing second processing that inserts the storage appliance providing virtualized storage between the second host and the data storage system, wherein after said second processing, the first logical device is presented, through the storage appliance, to the second host as the second logical device, wherein the second host identifies the second logical device and the first logical device as the same logical device using the signature uniquely identifying the data store.

2. The method of claim 1, wherein the first logical device and the second logical device are configured to each have a different logical device identifier.

3. The method of claim 2, wherein the data store is a virtual machine file system data store and wherein, prior to said first processing, the first host includes a first virtual machine and the second host includes a second virtual machine.

4. The method of claim 3, wherein the first logical device and the second logical device are identified by the first host and the second host as the same logical device configured with the virtual machine file system data store as the same data store.

5. The method of claim 4, wherein prior to said first processing, the first virtual machine and the first host access the data store through the first logical device and not the second logical device.

6. The method of claim 5, wherein said first processing includes:

migrating the first virtual machine from the first host to the second host while any application executing in a context of the first virtual machine continues execution in the context of the first virtual machine during the migration of the first virtual machine from the first host to the second host; and wherein said second processing includes:

migrating the first virtual machine and the second virtual machine from the second host to the first host while any applications executing in a context of the first virtual machine continue execution in the context of the first virtual machine during the migrating of the first virtual machine from the second host to the first host, and any applications executing in a context of the second virtual machine continue execution in the context of the second virtual machine during the migrating of the second virtual machine from the second host to the first host.

7. The method of claim 6, wherein after said first processing and after migrating the first virtual machine from the second host to the first host, the first virtual machine and the first host access the data store through the second logical device presented by the storage appliance, and the first virtual machine and the first host do not access the data store through the first logical device presented by the data storage system.

8. The method of claim 7, wherein prior to said second processing, the second virtual machine and the second host access the data store through the first logical device and not the second logical device.

9. The method of claim 8, wherein additional processing is performed subsequent to said second processing, said additional processing including:
  migrating the second virtual machine from the first host to the second host while any applications executing in a context of the second virtual machine continue execution during the migration of the second virtual machine from the first host to the second host.

10. The method of claim 9, wherein after said additional processing, the second virtual machine and the second host access the data store through the second logical device presented by the storage appliance, and the second virtual machine and second host do not access the data store through the first logical device presented by the data storage system.

11. The method of claim 1, wherein the first processing includes the first host mounting the second logical device having the data store identified using the signature, and wherein the second processing includes the second host mounting the second logical device having the data store identified using the signature, and wherein the first logical device and the second logical device are viewed by the first host after the first processing and viewed by the second host after the second processing as including the data store as the same data store on both the first logical device and the second logical device.

12. A system comprising:
  at least one processor; and
  at least one memory comprising code stored thereon, that when executed, performs a method of non-disruptive insertion of a storage appliance providing virtualized storage comprising:
    exposing a first logical device of a data storage system to a first host and a second host, wherein a data store is provisioned from physical storage of the first logical device and the data store is uniquely identified by a signature stored on the first logical device, wherein the first host and the second host each identify the first logical device using the signature uniquely identifying the data store;
    performing first processing that inserts the storage appliance providing virtualized storage between the first host and the data storage system, wherein after said first processing, the first logical device is presented, through the storage appliance, to the first host as a second logical device, wherein the first host identifies the second logical device and the first logical device as a same logical device using the signature uniquely identifying the data store, wherein the first logical device is provisioned from first physical non-volatile storage of the data storage system, wherein the data store has its data stored on the first physical non-volatile storage provisioned for the first logical device, wherein the second logical device presented by the storage appliance is mapped to the first logical device, and the second logical device is provisioned from the first physical non-volatile storage provisioned for the first logical device; and
    performing second processing that inserts the storage appliance providing virtualized storage between the second host and the data storage system, wherein after said second processing, the first logical device is presented, through the storage appliance, to the second host as the second logical device,
  wherein the second host identifies the second logical device and the first logical device as the same logical device using the signature uniquely identifying the data store.

13. A non-transitory computer readable medium comprising code stored thereon that, when executed, performs a method for non-disruptive insertion of a storage appliance providing virtualized storage comprising:
  exposing a first logical device of a data storage system to a first host and a second host, wherein a data store is provisioned from physical storage of the first logical device and the data store is uniquely identified by a signature stored on the first logical device, wherein the first host and the second host each identify the first logical device using the signature uniquely identifying the data store;
  performing first processing that inserts the storage appliance providing virtualized storage between the first host and the data storage system, wherein after said first processing, the first logical device is presented, through the storage appliance, to the first host as a second logical device, wherein the first host identifies the second logical device and the first logical device as a same logical device using the signature uniquely identifying the data store, wherein the first logical device is provisioned from first physical non-volatile storage of the data storage system, wherein the data store has its data stored on the first physical non-volatile storage provisioned for the first logical device, wherein the second logical device presented by the storage appliance is mapped to the first logical device, and the second logical device is provisioned from the first physical non-volatile storage provisioned for the first logical device; and
  performing second processing that inserts the storage appliance providing virtualized storage between the second host and the data storage system, wherein after said second processing, the first logical device is presented, through the storage appliance, to the second host as the second logical device,
wherein the second host identifies the second logical device and the first logical device as the same logical device using the signature uniquely identifying the data store.

14. The non-transitory computer readable medium of claim 13, wherein the first logical device and the second logical device are configured to each have a different logical device identifier.

15. The non-transitory computer readable medium of claim 14, wherein the data store is a virtual machine file system data store and wherein, prior to said first processing, the first host includes a first virtual machine and the second host includes a second virtual machine.

16. The non-transitory computer readable medium of claim 15, wherein the first logical device and the second logical device are identified by the first host and the second host as the same logical device configured with the virtual machine file system data store as the same data store.

17. The non-transitory computer readable medium of claim 16, wherein prior to said first processing, the first virtual machine and the first host access the data store through the first logical device and not the second logical device.

18. The non-transitory computer readable medium of claim 17, wherein said first processing includes:
   migrating the first virtual machine from the first host to the second host while any application executing in a context of the first virtual machine continues execution in the context of the first virtual machine during the migration of the first virtual machine from the first host to the second host; and wherein said second processing includes:
   migrating the first virtual machine and the second virtual machine from the second host to the first host while any applications executing in a context of the first virtual machine continue execution in the context of the first virtual machine during the migrating of the first virtual machine from the second host to the first host, and any applications executing in a context of the second virtual machine continue execution in the context of the second virtual machine during the migrating of the second virtual machine from the second host to the first host.

19. The non-transitory computer readable medium method of claim 18, wherein after said first processing and after migrating the first virtual machine from the second host to the first host, the first virtual machine and the first host access the data store through the second logical device presented by the storage appliance, and the first virtual machine and the first host do not access the data store through the first logical device presented by the data storage system.

* * * * *